United States Patent [19]
Murphy

[11] Patent Number: 4,946,025
[45] Date of Patent: Aug. 7, 1990

[54] APPARATUS AND METHOD FOR SEPARATING ARTICLES ON A CONVEYOR

[75] Inventor: James F. Murphy, Lynchburg, Va.

[73] Assignee: Simplimatic Engineering Company, Lynchburg, Va.

[21] Appl. No.: 276,776

[22] Filed: Nov. 28, 1988

[51] Int. Cl.⁵ ............................................. B65G 47/26
[52] U.S. Cl. .................................. 198/459; 198/465.1; 198/795
[58] Field of Search ................. 198/795, 803.01, 465.1, 198/465.2, 459

[56] References Cited

U.S. PATENT DOCUMENTS

| | | | |
|---|---|---|---|
| 2,424,055 | 7/1947 | Rousseau | 198/177 |
| 2,805,754 | 9/1957 | Geertsen | 198/34 |
| 3,049,214 | 8/1962 | Cormia et al. | 198/19 |
| 3,575,713 | 4/1971 | Duff et al. | 134/23 |
| 4,227,606 | 10/1980 | Bogatzki | 198/459 |
| 4,583,633 | 4/1986 | Spiegel et al. | 198/459 |
| 4,605,121 | 8/1986 | Wahren | 198/803 |
| 4,613,034 | 9/1986 | Hibi et al. | 198/465 |

FOREIGN PATENT DOCUMENTS 0243726 10/1986 Japan ..................... 198/795

Primary Examiner—Robert J. Spar
Assistant Examiner—D. Glenn Dayoan
Attorney, Agent, or Firm—St. Onge Steward Johnston & Reens

[57] ABSTRACT

A method is provided for conveying a series of articles along a conveyor path freely disposed on a conveyor surface while maintaining protective article-to-article separation. The method comprises the steps of introducing each article one at a time in a series to the conveyor surface, alternating the introducing of the articles with introduction to the conveyor surface of at least one relatively noncompressible and inelastic spacer freely disposed between adjacent articles in the series for separating the adjacent articles from each other, and conveying the series of articles alternated with the spacer on either side thereof along the conveyor, the articles being free to contact the spacer but not any other article in the series.

19 Claims, 3 Drawing Sheets

APPARATUS AND METHOD FOR SEPARATING ARTICLES ON A CONVEYOR

FIELD OF THE INVENTION

The present invention relates to a spacer for separating articles being conveyed on a conveyor surface. More particularly, an apparatus and method is provided for maintaining protective separation between articles freely disposed on the conveyor surface, as said articles are being conveyed in single file along a conveyor path.

BACKGROUND OF THE INVENTION

It is known in the prior art to convey articles along a conveyor, and the problem of maintaining any necessary separation between these articles being conveyed has been solved in different ways. For example, U.S. Pat. No. 4,605,121 to Wahren shows conveying object carriers between stations on a continuously moving conveyor surface with buffers of elastic rings between said carriers. Upon halting of a carrier such as at a workstation, upstream carriers may continue to be forced in a downstream direction and the elastic rings are compressed with an increase in article feed line pressure increases. Upon compression, the rings expand outwardly to frictionally engage a braking surface such as sidewalls of the conveyor and thereby slow the carriers down to avoid a moving carrier from directly striking or being forced against a stationary carrier with excessive force.

Other devices and methods for conveying articles are shown in U.S. Pat. Nos. 4,613,034; 4,583,633; 4,227,606; 3,575,713; 3,049,214; 2,805,754; and 2,424,055.

However, these prior art devices are not generally directed to an economical, simple, and efficient apparatus and method for maintaining adequate separation between freely disposed articles on a conveyor, especially where portions of the articles should not touch any other object.

SUMMARY OF THE INVENTION

In accordance with one preferred embodiment of the present invention, apparatus is provided for conveying a series of articles along a conveyor path freely disposed on a conveyor surface while maintaining protective separation between adjacent ones of articles in the series. An endless conveying surface has an upper run extending along the path and has guide members associated therewith, the guide members in combination with the surface defining the path, which is dimensioned for accepting articles in a series in single file therein. Means is provided for receiving these articles onto the upper run of the conveying surface in contact therewith, and means is further provided for buffering adjacent articles in single file, each from the other, the buffering means being relatively inelastic and noncompressible. The buffering means is introducible to the conveyor receiving means in freely disposed contact with the conveying surface, and the buffering means abuts adjacent articles on either side of the buffering means in a manner nondestructive to said articles. Also provided is means for introducing at least one of the buffering means to said receiving means in alternation with each said article in the series, thereby providing a procession of articles alternated with at least one buffering means in single file along said conveyor path.

In one particularly preferred embodiment, the buffering means includes a generally cylindrical member formed along a cylinder axis with a diameter sufficient to separate immediately adjacent upstream and downstream articles. The cylindrical member has a generally flat first surface substantially perpendicular to the cylinder axis for supporting the member upright on the surface generally perpendicular to the conveying direction.

In a further particularly preferred embodiment, the buffering means includes cylindrically shaped means formed along a cylindrical axis, this buffering means including a plurality of cylindrical contours disposed about the cylindrical axis, with selected ones of the contours having smaller diameters than other contours. The other contours are for contacting adjacent articles upstream and downstream of said buffering means, but not at said defined portions. At least one of the selected contours corresponds to but does not contact the defined portions. In this manner, particularly sensitive areas of the articles being conveyed may be restricted against contact not only with other articles but with the spacer itself.

Also provided in accordance with one preferred embodiment of the present invention is a method of conveying a series of articles along a conveyor path freely disposed on a conveyor surface while maintaining protective article-to-article separation. The method comprises the steps of introducing each article one at a time in a series to the conveyor surface; alternating the introduction of the articles with introduction to said conveyor surface of at least one relatively noncompressible and inelastic protective means, such as cylindrically shaped spacer means, freely disposed between adjacent articles in said series for separating said adjacent articles from each other; and conveying this series of articles alternated with protective means on either side thereof along said conveyor. The articles are free to contact the protective means, but not any other article in the series.

Also provided in accordance with one preferred embodiment of the present invention is a spacer for maintaining separation between articles being conveyed in a series on a conveyor surface along a conveyor path. The spacer preferably comprises at least one cylindrical member having one end surface positionable on said conveyor surface to carry said spacer along said path in a generally upright orientation. The spacer also has at least one cylindrically shaped outer surface perpendicular to said end surface for abutting both upstream and downstream adjacent articles to maintain protective separation of adjacent articles in the series.

The present invention provides apparatus for conveying a series of articles freely disposed in single file along a conveyor surface, while maintaining protective separation between adjacent articles in the series.

The present invention also provides a spacer for use between adjacent articles in a series of articles being conveyed along a conveyor path to provide protective separation between articles.

The present invention also provides a shaped spacer for use between articles being conveyed to provide protective separation between adjacent articles, while not permitting any contact against certain defined areas of said articles.

Further objects and advantages of the present invention will become apparent from the following description of the drawings and the preferred embodiments.

DETAILED DESCRIPTION OF THE PREFERRED EMBODIMENT

Figure 1:
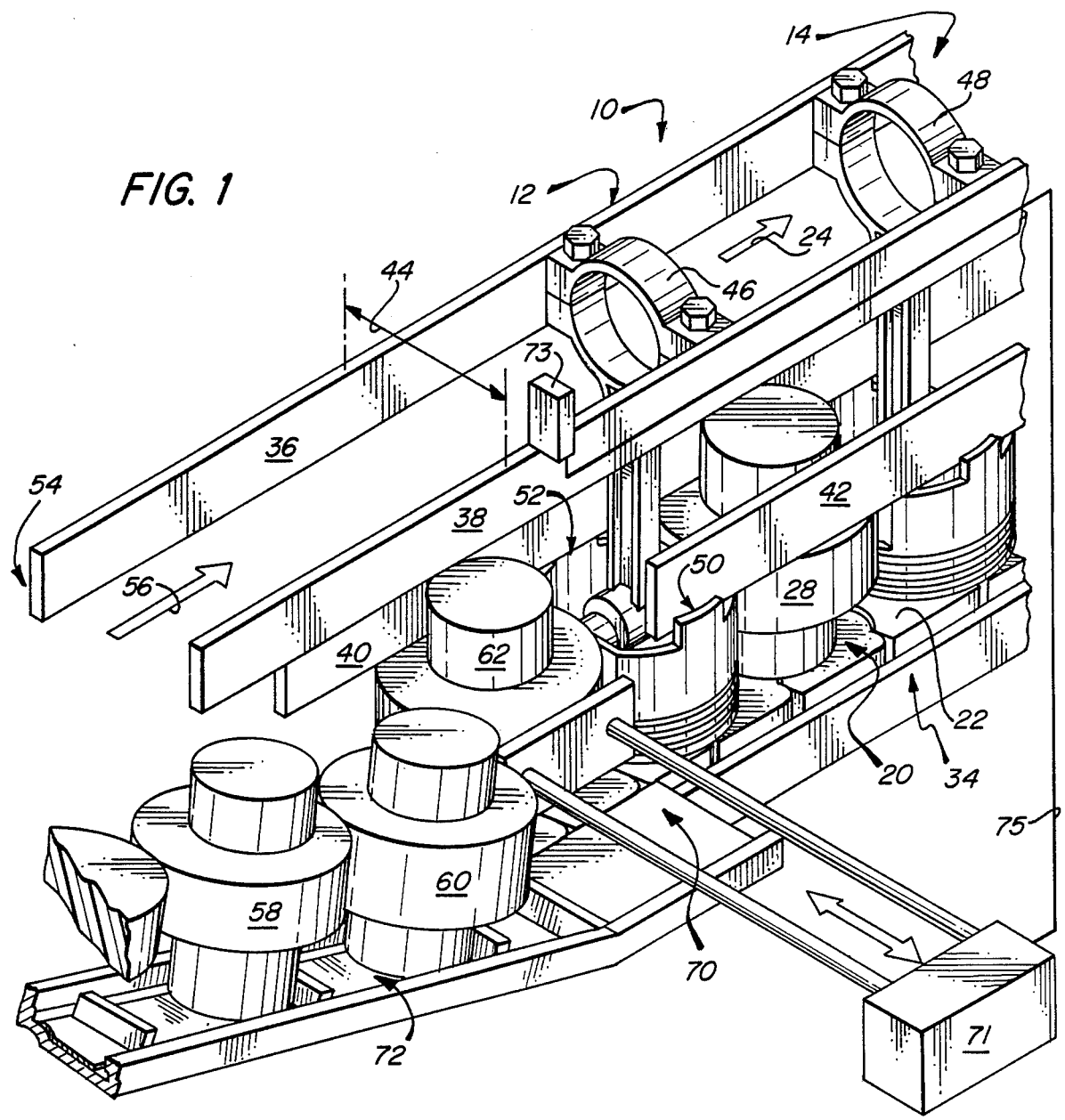
FIGS. 1 and 1A show a perspective view of the apparatus of the present invention.
Figure 1A:
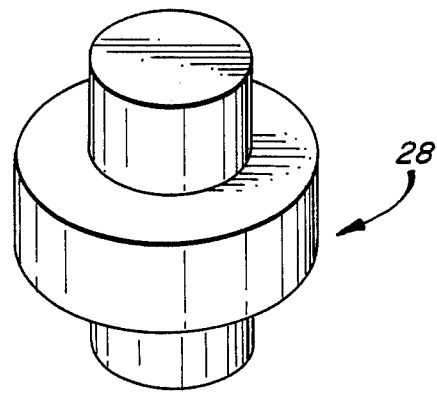
Figure 2:
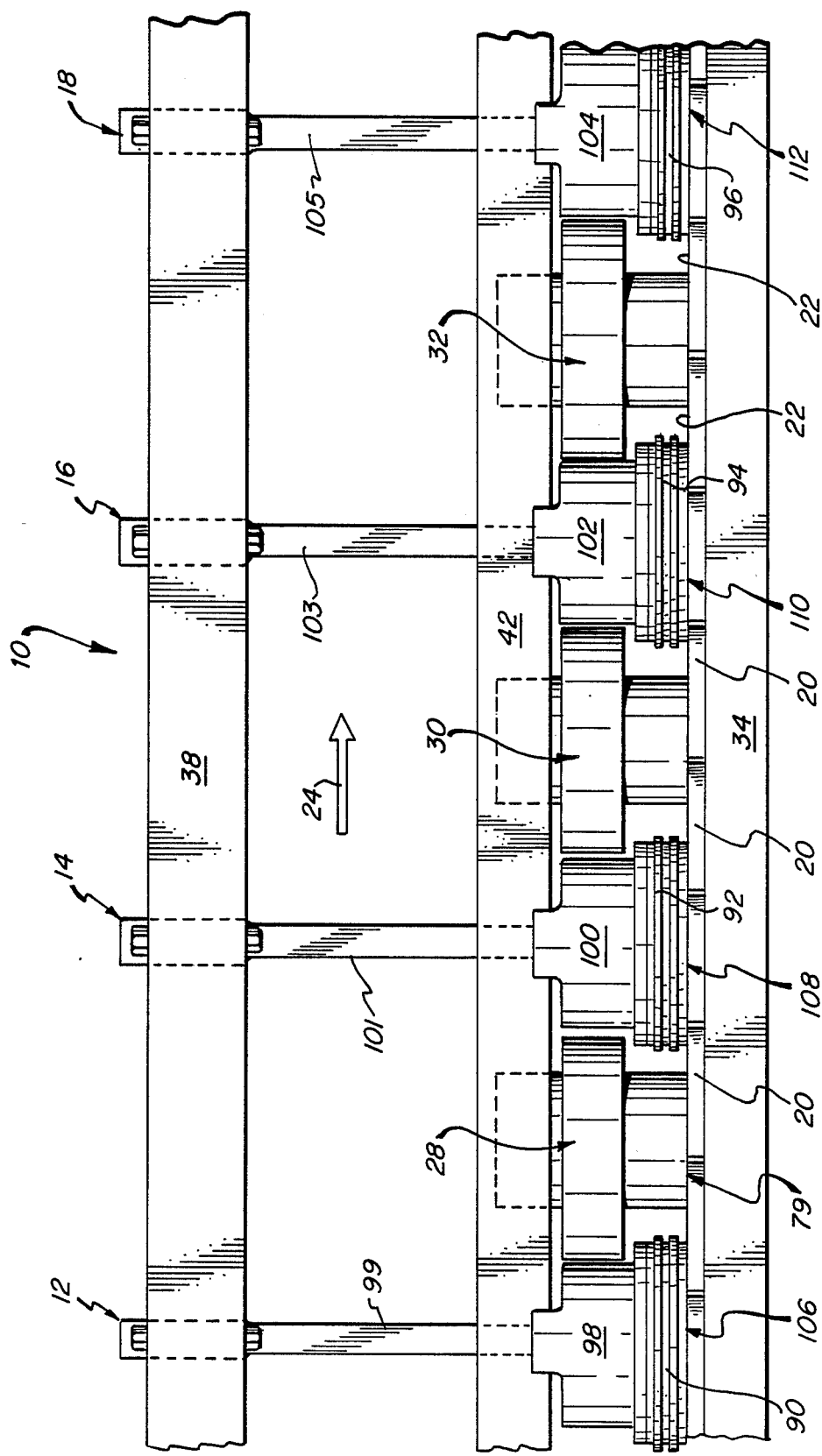
FIG. 2 shows a side view of a section of the apparatus of FIGS. 1 and 1A.

With reference now to FIGS. 1, 1A, and 2, apparatus indicated generally at 10 is shown for conveying a series of articles such as pistons 12, 14, 16, and 18 along conveyor 20 freely disposed on conveyor surface 22 along a path and in a direction indicated by arrow 24.

Pistons 12, 14, 16, and 18, which could be any suitable or desired articles, objects, or workpieces, are freely disposed on conveyor surface 22, in that there are no cleats or other such transversely disposed members fixed to or associated with said conveyor or conveyor surface for maintaining protective separation between adjacent pistons. A plurality of buffering means of the present invention such as spacers 28, explained more fully in detail below, are alternated as indicated at 28, 30, and 32 between pistons 12, 14, 16, and 18 to maintain protective separation therebetween. Spacers 28, 30, and 32 are supportable on surface 22 in a freely disposed manner for freely contacting pistons both upstream and downstream thereof to avoid piston to piston contact as described below.

With specific reference now to FIG. 1, endless conveying surface 22 has an upper run indicated generally at 34, with the return run not being shown. Conveying surface 22 extends along a path indicated by arrow 24 and has guide members such as rails 36, 38 and 40, 42 associated therewith, which in combination with surface 22 define path 24. The path 24 is dimensioned, such as for example in width indicated at 44, for accepting pistons such as at 12, 14, 16, and 18 in a series in single file. Width 44 is chosen so that the upwardly pointing coupling ends such as 46 and 48 of pistons 12 and 14 fit therebetween. Also, each piston has a pair of diametrically opposed lips, such as lips 50 and 52, which depend in a direction towards coupling ends 46 and 48. Guide rails 40 and 42 are spaced apart a predetermined distance corresponding to approximately width 44, so as to engage piston lips 50 and 52 to further guide pistons 12, 14, 16, and 18 along path 24 in a series in single file on surface 22. Rails 36, 38 and 40, 42 are terminated in the region indicated generally at 54 to provide an opening or means for receiving pistons onto upper runs 34 of conveyor 20 in contact with conveyor surface 22. These pistons or other articles can be inserted as indicated by arrow 56 manually or by a suitable device or mechanism (not shown), which forms no part of the instant invention.

Buffering means, such as the spacers indicated generally at 28 and more specifically at 30, 32, 58, 60, and 62, are positioned for protectively separating adjacent articles in the single file, such as for example pistons 12 and 14, from each other and preventing article to article contact, which contact is undesirable for the pistons herein described because of the resultant damage from marring or scuffing. As will be described more fully hereinbelow, spacers such as 28 are formed from a relatively inelastic and noncompressible material such as polyethylene, which is subjected to compressive forces along the direction of path 24 due to normal line pressure. The spacers 28 are relatively nondeformable; otherwise, under normal line pressure, the spacers 28 might deform in a direction transverse to and outwardly of path 24, which could result in frictional engagement of guide rails 40 and 42 with undesirable braking action and increased line pressure. However, spacers 28 are relatively soft compared to the articles such as pistons being conveyed to avoid damage from the normal contact between spacers and articles. Suitable materials for spacer 28 other than polyethylene include, by way of example only, polyurethane. Therefore, spacers 28 can abut articles on either side, specifically such as pistons 12 and 14 on either side of spacer 28, in a manner nondestructive to either piston.

As shown in FIG. 1, the apparatus of the present invention also preferably includes a pusher mechanism such as at 70 operable under the direction of a controller such as for example routine programmable controller 71, which introduces at least one of said spacers such as spacer 62 from a suitably disposed supply 72 of spacers after each piston to alternate in the manner of piston-spacer-piston-spacer-piston and so on for the spacers in single file. This pusher mechanism 70 operates in a timed relationship relative to the introduction of each piston by means of inputs from routine sensor 73, such as for example a photoelectric sensor, along line 75 to controller 71. In this manner, a procession of articles with spacers between each article is provided as represented by the following series shown in FIG. 2: piston 12, spacer 28, piston 14, spacer 30, piston 16, spacer 32, piston 18, and so on.

Figure 3A:
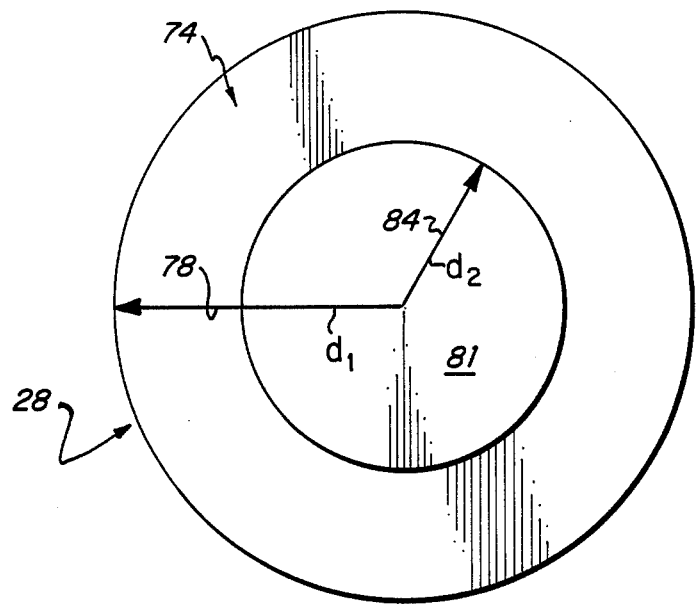
FIGS. 3A and 3B show top and side views respectively of the spacer of the present invention.
Figure 3B:
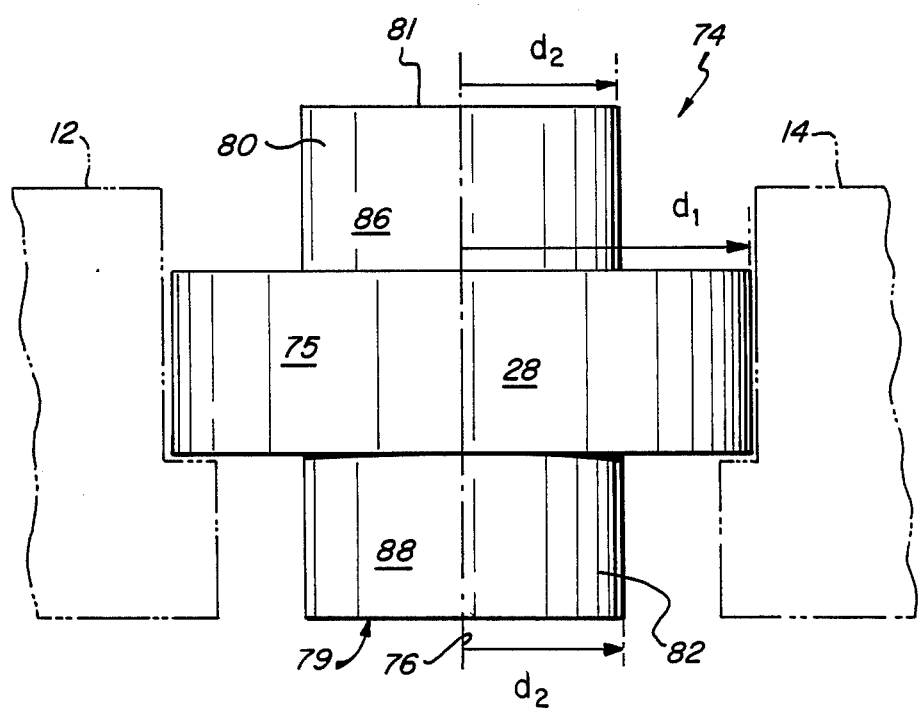

With reference now to FIG. 3A, it is seen that spacer 28 is described in more detail. Inasmuch as all spacers are substantially identical, the perspective view of spacer 28 in FIG. 1 along with the top and side views of substantially identical spacer 28 in FIGS. 3A and 3B provide a full description of the preferred buffering means of the present invention.

By way of example only with respect to spacer 28, spacer 28 is a generally cylindrical member 74 with a cylindrically shaped contour 75 formed about and along cylinder axis 76 and having three sections, a first section of diameter $d_1$ indicated at 78 sufficient to separate an immediately upstream article such as 12 from an immediately downstream article such as 14. Cylindrical member 74 has a generally flat surface 79 perpendicular to cylindrical axis 76 for supporting cylindrical member 74 upright on conveying surface 22 as shown in FIG. 2 in a direction generally perpendicular to surface 22 as well as path or conveying direction 24.

Member 74 also preferably has portions of lesser diameter $d_2$ indicated at 84 on either end indicated at 80 and 82 with diameters less than $d_1$ with corresponding cylindrically shaped contours 86 and 88 formed about and along axis 76.

The utility of reduced diameter portions 86 and 88 resides in avoiding any contact with ring portions 90, 92, 94, and 96 of piston head portions 98, 100, 102, and 104. The piston heads have flat end surfaces 106, 108, 110, and 112, which ride on the conveyor surface 22. The outer surface portions of pistons corresponding to ring portions 90, 92, 94, and 96 are preferably restricted from contact even with the spacers, the spacers being shaped as shown in FIGS. 3A and 3B to avoid such contact. Pistons also have stem portions 99, 101, 103, and 105 for pistons 12, 14, 16, and 18 respectively.

By forming reduced diameter portions 80 and 82 on opposing ends of spacer 28 with cylindrical member 74 being symmetrical about any place in which cylindrical axis 76 lies, spacer 28 can be placed on conveyor surface 22 with either flat end 79 or 81 in contact therewith.

Using the apparatus shown in FIGS. 1, 1A, 2, 3A, and 3B, a method is provided of conveying a series of articles such as pistons 12, 14, 16, and 18 along a path indicated by arrow 24, the articles being freely disposed on surface 24, while maintaining protective article-to-article separation. The articles such as pistons 12, 14, 16, and 18 are introduced one at a time in a series to conveyor surface 22 in the receiving area 54 of conveyor 20. The introduction of each piston is alternated with the introduction of at least one relatively noncompressible and inelastic protective means such as spacers 28, 30, and 32, which are freely disposed between adjacent pistons 12, 14, 16, and 18 as shown in FIG. 2 for separating these pistons from each other. This introduction is accomplished by pushing the spacers one at a time from a supply 72 thereof onto the conveyor surface 22 in timed relationship to the introduction of each piston. The series of pistons with said spacers alternated therebetween, wherein there is at least one spacer on either side of each piston (except for first and last pistons in the series, where either the leading and/or trailing spacers may be optional), is conveyed along conveyor path 24, the pistons being free to abuttingly contact adjacent spacers but not any other article in the series.

It should be understood that various changes and modifications to the preferred embodiments described above will be apparent to those skilled in the art. Such changes and modifications can be made without departing from the spirit and scope of the present invention, and it is therefore intended that such changes and modifications be covered by the following claims.

I claim:

1. A method for conveying a series of articles along an endless conveyor path freely disposed on an endless conveyor surface having an upper run while maintaining protective article-to-article separation, said method comprising the steps of:
   (a) moving an article from an article storage zone onto said endless conveyor surface;
   (b) moving a noncompressible and inelastic protective means from a supply storage zone onto the endless conveyor surface for providing a freely disposed member directly adjacent the article;
   (c) alternatingly repeating steps (a) and (b) to provide a continuous series of articles with noncompressible and inelastic protective means alternatingly dispersed between each article, for protecting and separating said articles; and
   (d) conveying said series of articles alternated with said protective means on either side thereof along said endless conveyor surface, said articles being free to contact said protective means but not any other article in said series.

2. The method of claim 1, wherein said alternating step includes the step of interjecting said protective separating means after each one of said articles in said series of said articles.

3. The method of claim 2, wherein said interjecting step includes the step of inserting said protective means one at a time from said supply storage zone thereof onto said endless conveyor surface at an entry area of said upper run of said conveyor surface in said alternating fashion with said articles.

4. The method of claim 3, wherein said inserting step includes the step of pushing said protective means onto said endless conveyor surface in timed relationship to the introducing of each said article past said entry area.

5. The method of claim 4, wherein said inserting step includes the step of pushing ones of said protective means onto said endless conveyor surface prior to the introducing of each said article.

6. The method of claim 5, wherein said inserting step further includes the step of pushing at least one said protective means onto said endless conveyor surface after the introducing of each said article.

7. Apparatus for conveying a series of articles along a conveyor path freely disposed on a conveyor surface while maintaining protective separation between adjacent ones of said articles in said series, said apparatus comprising:
   (a) an endless conveying surface having an upper run extending along said path and having guide members associated therewith, said guide members in combination with said surface defining said path dimensioned for accepting said articles in a series in single file therein;
   (b) means for receiving said articles onto said upper run of said conveying surface in contact therewith;
   (c) means for buffering adjacent articles in said single file each from the other, said buffering means being relatively inelastic and noncompressible and introducible to said receiving means in freely disposed contact with said conveying surface, said buffering means for abutting adjacent articles on either side of said buffering means in a manner nondestructive to said articles; and
   (d) means for introducing at least one of said buffering means to said receiving means in alternation with each said article, in said series; thereby providing a procession of articles alternated with at least one buffering means in single file along said conveyor path.

8. The apparatus of claim 7, wherein said buffering means comprises at least one means supportable on said conveying surface for freely contacting articles both upstream and downstream of said buffering means to restrain adjacent articles in said series from contacting each other.

9. The apparatus of claim 8, wherein said buffering means includes a generally cylindrical member formed along a cylinder axis and having a diameter sufficient to separate immediately adjacent upstream and downstream articles and having a generally flat first surface substantially perpendicular to said cylinder axis for supporting said member upright on said surface generally perpendicular to the conveying direction.

10. The apparatus of claim 8, wherein said contacting means includes a second surface comprising a cylindrically shaped surface formed about said axis of said cylindrical member.

11. The apparatus of claim 8, wherein each said article has an outer surface with a defined portion thereof to be restricted against contact with either another article or said buffering means, and said buffering means is shaped to abut said outer surface at at least one point, but not at any point on said defined portion.

12. The apparatus of claim 11, wherein said buffering means includes cylindrically shaped means formed along a cylindrical axis, said means including a plurality of cylindrical contours disposed about said cylindrical axis, selected ones of said contours having smaller diameters than other ones of said contours, said other ones of said contours for contacting adjacent articles upstream and downstream of said buffering means but not at said defined portions, at least one of said selected ones of said contours matching but not contacting said defined portions.

13. The apparatus of claim 10, wherein said articles comprise pistons having a head portion and a stem portion, said head portion having a relatively flat top surface generally perpendicular to said stem portion, and said conveyor surface is for supporting said pistons in an inverted position by supporting said top surface on said conveying surface, said guide members further for supporting said stem portions in a direction generally perpendicular to said conveying surface, and said buffering means comprises a cylindrical member having one end face perpendicular to said cylindrical axis for being positioned on said conveying surface and a cylindrically shaped face for contacting said piston head portions.

14. The apparatus of claim 13, wherein said piston head portion further has an outer surface with a piston ring region extending circumferentially around said head portion, and said cylindrical face has a cutaway extending circumferentially around said cylindrical face for corresponding to said ring region, whereby said ring region is not in abutment with either said buffering means or another piston head.

15. The apparatus of claim 14, wherein said cylindrical member has another end face opposite said one end face, and said cylinder also forms first and second cutaways associated with said ends, whereby said cylinder can be placed on said conveyor surface with either end being in contact therewith.

16. The apparatus of claim 15, wherein said cylindrical member is symmetrical about any plane in which said cylindrical axis lies.

17. The apparatus of claim 16, wherein said cylindrical member comprises polyethylene.

18. The apparatus of claim 7, wherein said introducing means includes at least one means for pushing said buffering means from a supply thereof onto said conveyor surface one at a time in timed relationship to the introduction of each said article.

19. A spacer for maintaining separation between articles being conveyed in a series on a conveyor surface along a conveyor path, said spacer comprising at least one generally cylindrical member formed along a cylindrical axis, said member having one end surface positionable on said conveyor surface to carry said spacer along said path in a generally upright orientation, said end surface corresponding to at least a portion of a plane perpendicular to said axis, said member further comprising at least one outer surface perpendicular to said end surface for abutting both upstream and downstream adjacent articles to maintain protective separation of adjacent articles in the series, said outer surface further including a first cylindrical surface having diameter $d_1$, and also a second cylindrical surface having diameter $d_2$, wherein $d_1 > d_2$, said first cylindrical surface for abutting said articles and said second cylindrical surface being restrained by said first cylindrical surface from abutting said article.

* * * * *